United States Patent
Hurry et al.

(10) Patent No.: US 10,073,962 B2
(45) Date of Patent: Sep. 11, 2018

(54) SYSTEM AND METHOD EMPLOYING REDUCED TIME DEVICE PROCESSING

(71) Applicant: VISA INTERNATIONAL SERVICE ASSOCIATION, San Francisco, CA (US)

(72) Inventors: Simon Hurry, Foster City, CA (US); Aron Clark, San Jose, CA (US); Marc Cleven, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 273 days.

(21) Appl. No.: 15/171,982

(22) Filed: Jun. 2, 2016

(65) Prior Publication Data

US 2017/0286663 A1    Oct. 5, 2017

Related U.S. Application Data

(60) Provisional application No. 62/317,450, filed on Apr. 1, 2016.

(51) Int. Cl.
| | | |
|---|---|---|
| *G06F 21/34* | (2013.01) | |
| *G06F 21/60* | (2013.01) | |
| *G06Q 20/40* | (2012.01) | |

(52) U.S. Cl.
CPC ............ *G06F 21/34* (2013.01); *G06F 21/602* (2013.01); *G06Q 20/409* (2013.01)

(58) Field of Classification Search
CPC ....... G06F 21/34–21/35; G06F 21/44–21/445; G06Q 20/327–20/3278; G06Q 20/409–20/40975; H04L 63/0428–63/0492; H04L 63/0853
See application file for complete search history.

(56) References Cited

U.S. PATENT DOCUMENTS

| | | | |
|---|---|---|---|
| 7,959,074 B1 | 6/2011 | Chopra | |
| 2007/0118483 A1* | 5/2007 | Hill | G06K 7/0008 705/64 |
| 2008/0110977 A1* | 5/2008 | Bonalle | G06K 19/06187 235/380 |
| 2012/0317035 A1 | 12/2012 | Royyuru | |

(Continued)

OTHER PUBLICATIONS

VISA. "Quick Chip for EMV®"; <https://www.visa.com/chip/merchants/grow-your-business/payment-technologies/credit-card-chip/docs/quick-chip-guide.pdf>, Published: Apr. 18, 2016. (Year: 2016).*

(Continued)

*Primary Examiner* — Kevin Bechtel
(74) *Attorney, Agent, or Firm* — Kilpatrick Townsend & Stockton, LLP

(57) ABSTRACT

Methods and systems for facilitating a transaction are provided. A transaction involving an integrated circuit user device in contact with an access device is processed in less time, such that the user device can be removed at an earlier time. In embodiments, an access device provides an estimated value to a user device such that a cryptogram can be generated without waiting for a final value. Additionally, the access device can store user device data and then complete the transaction with the user device before authorizing the transaction, such that the user device can be removed without waiting for an authorization response.

20 Claims, 6 Drawing Sheets

(56) References Cited

U.S. PATENT DOCUMENTS

2013/0179351 A1    7/2013  Wallner
2015/0262180 A1    9/2015  Hambleton
2016/0019533 A1    1/2016  Wu

OTHER PUBLICATIONS

PCT International Search Report and Written Opinion in re PCT/US2016/069460, filed Dec. 30, 2016, 15 pages.
EMV Integrated Circuit Card Specifications for Payment Systems, Book 3, Application Specification, Version 4, Nov. 2011.
Visa Integrated Circuit Card Specification (VIS), Version 1.5, May 2009, 560 pages.

* cited by examiner

SYSTEM AND METHOD EMPLOYING REDUCED TIME DEVICE PROCESSING

CROSS REFERENCE TO RELATED APPLICATIONS

This application is a non-provisional application of and claims the benefit of the filing date of U.S. Provisional Application No. 62/317,450, filed on Apr. 1, 2016, which is herein incorporated by reference in its entirety for all purposes.

BACKGROUND

Smart cards store user account data on integrated circuits rather than magnetic stripes. They can be contact cards that are physically inserted (or "dipped") into a reader (e.g., terminal). Smart card transactions improve security against fraud compared to magnetic stripe card transactions. However, smart card transactions traditionally take longer to process at the reader than traditional magnetic stripe card transactions where a user can simply, after initially swiping the card, put the card back in their pocket without waiting for the transaction to complete. This may cause frustration on the part of the user as they may not be happy waiting to remove the smart card until the smart card transaction is completed.

During an average smart card transaction, the user may have to wait eight to twelve seconds before being allowed to remove the smart card from the access device. Some smart card insertions can take over 20 seconds before the user can remove the smart card.

In addition to the actual increase in time, the user may perceive an even greater amount of time. The user may be accustomed to the swiping process which may be perceived as instantaneous since the card may never leave the user's hand, and the user can immediately replace the card into their pocket. Accordingly, any amount of time where the user releases the card and has to wait before putting it away may appear to stretch out for longer than the actual time.

The longer processing time for smart card transactions can also cause smart cards to be forgotten. For example, the processing time may be long enough that the user does not remember the smart card and leaves it behind when the transaction is finished. Additionally, the user may accidentally remove a smart card before it is ready. This can interrupt a transaction such that the transaction may need to be restarted.

Embodiments of the invention address these and other problems individually and collectively.

SUMMARY

One embodiment of the invention is directed to a method. The method comprises physically contacting, by an access device, a user device. The method also comprises receiving credentials from the user device for a transaction, and storing the credentials. The method further includes allowing the user device to be removed from the access device before an authorization response message for the transaction is received from an authorizing entity computer. The method also includes generating an authorization request message for the transaction, and transmitting the authorization request message to the authorizing entity computer. The method further comprises receiving an authorization response message for the transaction from the authorizing entity computer. The authorization response message is received while the user device is physically separated from the access device.

Another embodiment of the invention is directed to an access device configured to perform the above-described method.

Further details regarding embodiments of the invention can be found in the Detailed Description and the Figures.

DETAILED DESCRIPTION

Figure 1:
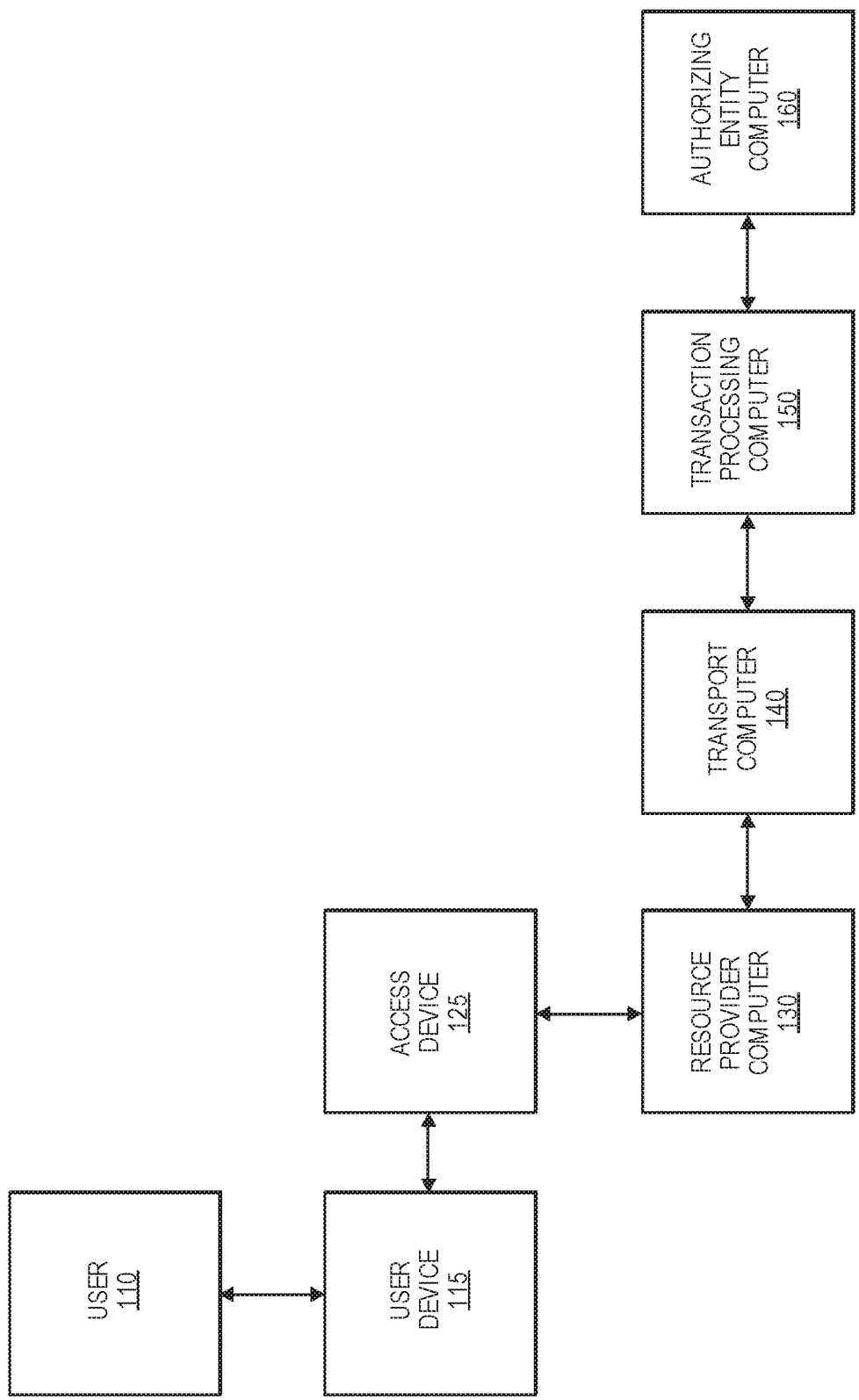
FIG. 1 shows a block diagram of a system according to an embodiment of the invention.

Embodiments of the present invention are directed to systems and methods for decreasing processing time for smart user device (e.g., contact chip card) based transactions in order to optimize the user experience. For years, consumers have been swiping their magnetic stripe cards at the access device and putting them back in their wallet without waiting for the transaction to complete. Embodiments described herein allow for the same fast and easy transaction processing to happen during smart user device transactions. Faster transaction processing can be achieved through one or more of the following changes to normal transaction processing.

In embodiments of the invention, the user device can be removed from the access device before the transaction is completed. For example, the access device can inform the user device that the transaction is completed or canceled (e.g., by requesting a second cryptogram), even though the transaction is actually still pending. The user device can then complete its processing for the current transaction, revert to a default setting, and thereby be ready for removal from the access device. As a result, the user device can be removed from the access device before an authorization request message is received from an authorizing entity.

In some embodiments, the access device can store user device information, thereby allowing the user device to be removed even earlier (e.g., before an authorization request message is sent). Instead of gathering user device information directly from the user device when generating an authorization request message, the stored information can be used for the authorization request message. Thus, once the user device information is received at the user device, the information can be stored at the access device and the user device can be removed. For example, the access device can complete communications with the user device (e.g., by informing the user device that online processing is not possible and requesting a cryptogram) immediately after the user device information is received and stored.

In some embodiments, the access device can provide an estimated or preset transaction amount to the user device. The user device may be able to use the estimated transaction amount when generating a cryptogram for the transaction. As a result, the user device may not need to wait for a final transaction amount to be determined before generating the cryptogram. Instead, the user device can provide credentials to the access device in parallel to purchase items being scanned and the transaction amount calculated. Accordingly, the user device can provide credentials to the access device immediately such that communications between the user device and access device can be completed without any delay, and then the user device can be removed. An authorization request message may then be sent that includes both the estimated amount and the final amount, such that the authorizing entity can verify the cryptogram as well as authorize the actual amount.

Embodiments of the invention allow user device insertion time to be reduced to two seconds or less. Thus, embodiments allow an average reduction in six to ten seconds (75%-83%) when compared to the current average of eight to twelve second insertion time, as well as a potential time reduction of eighteen seconds or more (90% or more) when compared to the current possible insertion time of twenty or more seconds. For a transaction where the user device is inserted before the final transaction amount is known (e.g., for a grocery store transaction), the user device insertion time can be further reduced by the time needed for the clerk to scan all the items (e.g., potentially minutes, depending on the number of items).

In addition, the embodiments described herein may require no changes to current access device systems. Current systems may only receive a software download to conform to embodiments described herein. No changes may be required to the standard transaction processing (e.g., EMV or Europay, MasterCard, and Visa processing) or the user device itself, and no additional testing or certification may be required. Further, there may be no impact to routing, merchant banks, the payment network, or the card issuer.

Embodiments of the invention can apply to any form of user device transaction. For example, any transaction involving a contact card and an access device can utilize these methods to reduce device-insertion time. As examples, embodiments can be used for payment transactions (e.g., paying with a smart credit card, debit card, or prepaid card at a merchant POS terminal), access transactions (e.g., gaining access to a restricted area with a smart access badge), or any other suitable type of transaction.

Prior to discussing specific embodiments of the invention, some terms may be described in detail.

A "user device" may include any suitable device associated with a user. The user device may comprise a substrate such as a paper or plastic card, and information that is printed, embossed, encoded, or otherwise included at or near a surface of an object. The user device may include circuitry with, for example, permanent voltage values for storing information. Suitable user devices can be hand-held and compact so that they can fit into a user's wallet and/or pocket (e.g., pocket-sized). A user device can operate at least in a contact mode. As an example, a user device can include a smart card. In some embodiments, a smart card can serve as a payment card, a security card, an access card, or any other suitable type of card. If the user device is in the form of a debit, credit, or smartcard, the user device may also optionally have features such as magnetic stripes. In some embodiments, a user device may be used to conduct a financial transaction. Such a user device may be referred to as a "payment device." For example, a user device may be associated with a value such as a monetary value, a discount, or store credit, and a user device may be associated with an entity such as a bank, a merchant, a payment processing network, or a person.

A "credential" may include any suitable information that serves as reliable evidence of worth, ownership, identity, or authority. A credential may be a string of numbers, letters, or any other suitable characters that may be present or contained in any object or document that can serve as confirmation. Examples of credentials include payment credentials, cryptograms, access credentials, and any other suitable type of credentials.

"Payment credentials" may include any suitable information associated with an account (e.g., a payment account and/or payment device associated with the account). Such information may be directly related to the account or may be derived from information related to the account. Examples of payment credentials may include a PAN (primary account number or "account number"), user name, expiration date, and verification values such as CVV (card verification value), dCVV (dynamic card verification value), CVV2 (card verification value 2), CVC3 card verification values, etc. An example of a PAN is a 16-digit number, such as "4147 0900 0000 1234." In some embodiments, payment credentials can include additional information that may be used for authorizing a transaction. For example, payment credentials can include a cryptogram associated with the transaction.

An "encryption key" may include any data value or other information suitable to cryptographically encrypt data. A "decryption key" may include any data value or other information suitable to decrypt encrypted data. In some cases, an encryption key and a decryption key may be the same (i.e., a "symmetric key").

A "cryptogram" may include encrypted information. For example, a cryptogram can be a set of text encrypted with an encryption key.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a user device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

FIG. 1 shows a system 100 comprising a number of components. The system 100 comprises a user device 115 operated by a user 110. The system 100 further comprises a resource provider computer 130, a transport computer 140, a transaction processing computer 150, and an authorizing entity computer 160, each of which may be embodied by one or more computers. The user device 115 may be connected with and/or in communication with an access device 125, which may in turn be in communication with the resource provider computer 130. Also, the resource provider computer 130, the transport computer 140, the transaction processing computer 150, and the authorizing entity computer 160 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Figure 2:
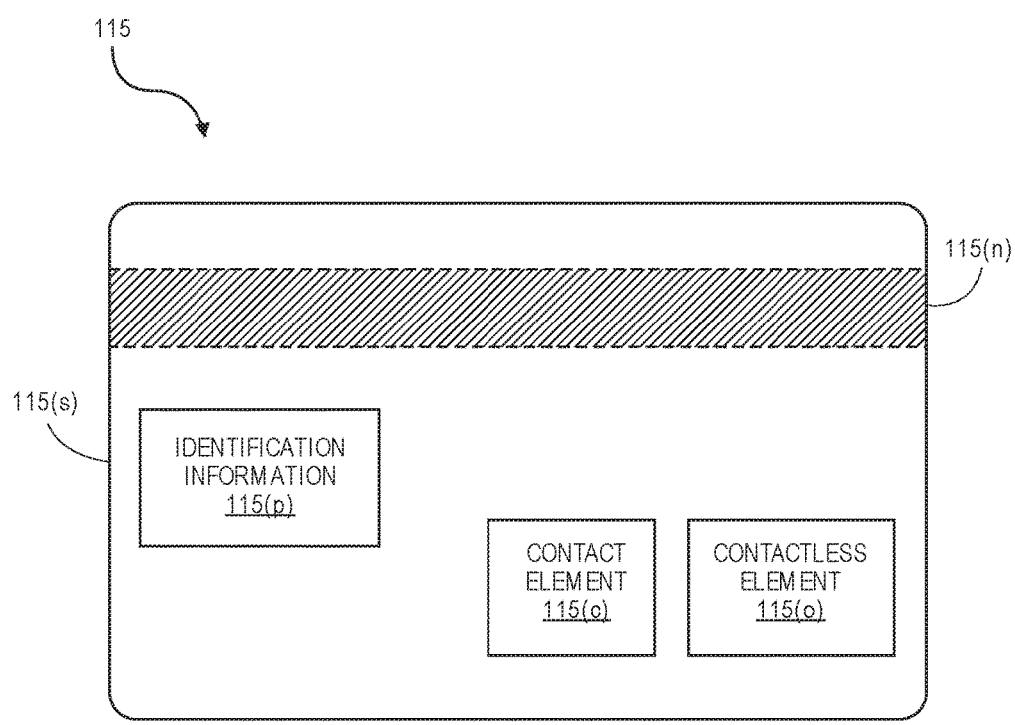
FIG. 2 shows a block diagram of an exemplary user device according to an embodiment of the invention.

An example of the user device 115, according to some embodiments of the invention, is shown in FIG. 2. As shown, in some embodiments, the user device 115 can take the form of a card comprising a plastic substrate 115(s). In some embodiments, the user device 115 may comprise a contact element 115(c) that is present on, or embedded within, the plastic substrate 115(s). A contact element 115(c) may include a microprocessor and/or a memory (e.g., memory chips with user data stored in them). The contact element 115(c) may enable the user device 115 to interface and communicate with the access device 125. In some embodiments, a contactless element 115(o) for interfacing with an access device may also be present on, or embedded within, the plastic substrate 115(s). A magnetic stripe 115(n) may also be on the plastic substrate 115(s). Identification information 115(p) may be printed or embossed on the card. Identification information can include, for example, an account number, expiration date, and/or a user name.

The user 110 may be able to use the user device 115 to conduct transactions with a resource provider associated with the resource provider computer 130. The user device 115 may store information associated with the user 110 and/or an account (e.g., at the contact element 115(c)). For example, the user device 115 may be a smart payment card, and the contact element 115(c) may store payment credentials as well as personal information such as a name, address, email address, phone number, or any other suitable identification information 115(p). The contact element 115(c) may be able to provide this information to the access device 125 during a transaction. The user device 115 may be assigned to a user 110 by an authorizing entity, such as an issuer bank.

Referring back to FIG. 1, the resource provider computer 130 may be associated with a resource provider, which may be an entity that can provide a resource such as goods, services, information, and/or access. Examples of a resource provider include merchants, access devices, secure data access points, etc. A merchant may typically be an entity that engages in transactions and can sell goods or services, or provide access to goods or services.

The resource provider may accept multiple forms of payment (e.g., the user device 115) and may use multiple tools to conduct different types of transactions. For example, the resource provider may operate a physical store and use the access device 125 for in-person transactions. The resource provider may also sell goods and/or services via a website, and may accept payments over the Internet.

Figure 3:
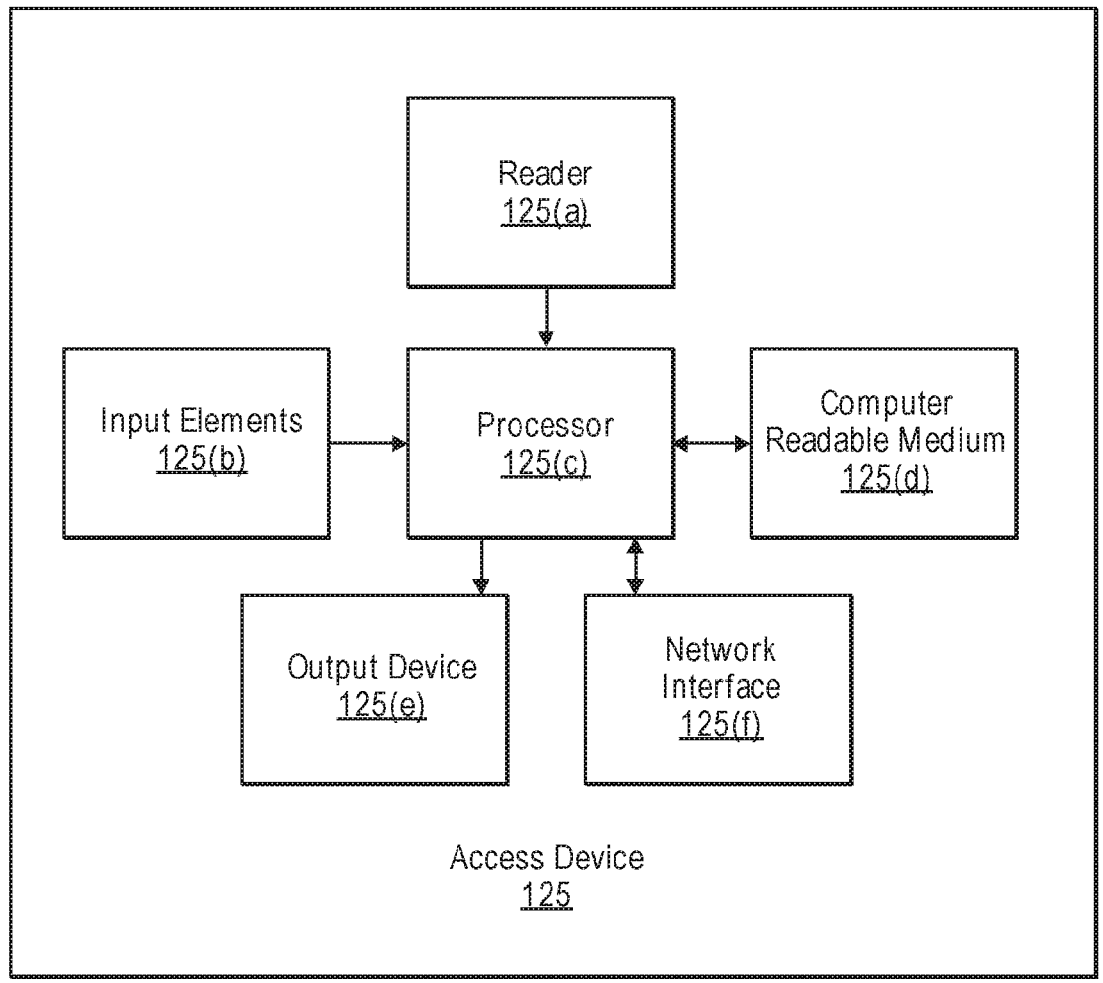
FIG. 3 shows a block diagram of an exemplary access device according to an embodiment of the invention.

An example of the access device 125, according to some embodiments of the invention, is shown in FIG. 3. The access device 125 may comprise a processor 125(c) operatively coupled to a computer readable medium 125(d) (e.g., one or more memory chips, etc.), input elements 125(b) such as buttons or the like, one or more readers 125(a) (e.g., a contact chip reader, a contactless reader, a magnetic stripe reader, etc.), an output device 125(e) (e.g., a display, a speaker, etc.) and a network interface 125(f). A housing may house one or more of these components.

The computer readable medium 125(d) may comprise instructions or code, executable by a processor. The instructions may include instructions for sending a command to a user device 115 upon making contact with that device, and instructions for communicating with the user device 115 to obtain credentials and otherwise process a transaction. The computer readable medium 125(d) may also include instructions for requesting authorizing of a transaction with the authorizing entity computer 160, and instructions for any other suitable function as described herein.

Referring back to FIG. 1, the transport computer 140 may be associated with an acquirer, which may typically be a business entity (e.g., a commercial bank) that has a business relationship with a particular merchant or other entity. Some entities can perform both issuer and acquirer functions. Some embodiments may encompass such single entity issuer-acquirers. The transport computer 140 may be more specifically referred to as an acquirer computer.

The transaction processing computer 150 may be disposed between the transport computer 140 and the authorizing entity computer 160. The transaction processing computer 150 may include data processing subsystems, networks, and operations used to support and deliver authorization services, exception file services, and clearing and settlement services. For example, the transaction processing computer 150 may comprise a server coupled to a network interface (e.g., by an external communication interface), and databases of information. The transaction processing computer 150 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The transaction processing computer 150 may use any suitable wired or wireless network, including the Internet.

The authorizing entity computer 160 may be associated with an authorizing entity, which may be an entity that authorizes a request. An example of an authorizing entity may be an issuer, which may typically refer to a business entity (e.g., a bank) that maintains an account for a user. An issuer may also issue and manage a payment account associated with the user device 115.

The transaction processing computer 150, the transport computer 140, and the authorizing entity computer 160 may operate suitable routing tables to route authorization request messages and/or authorization response messages using payment credentials, merchant identifiers, or other account identifiers.

Figure 4:
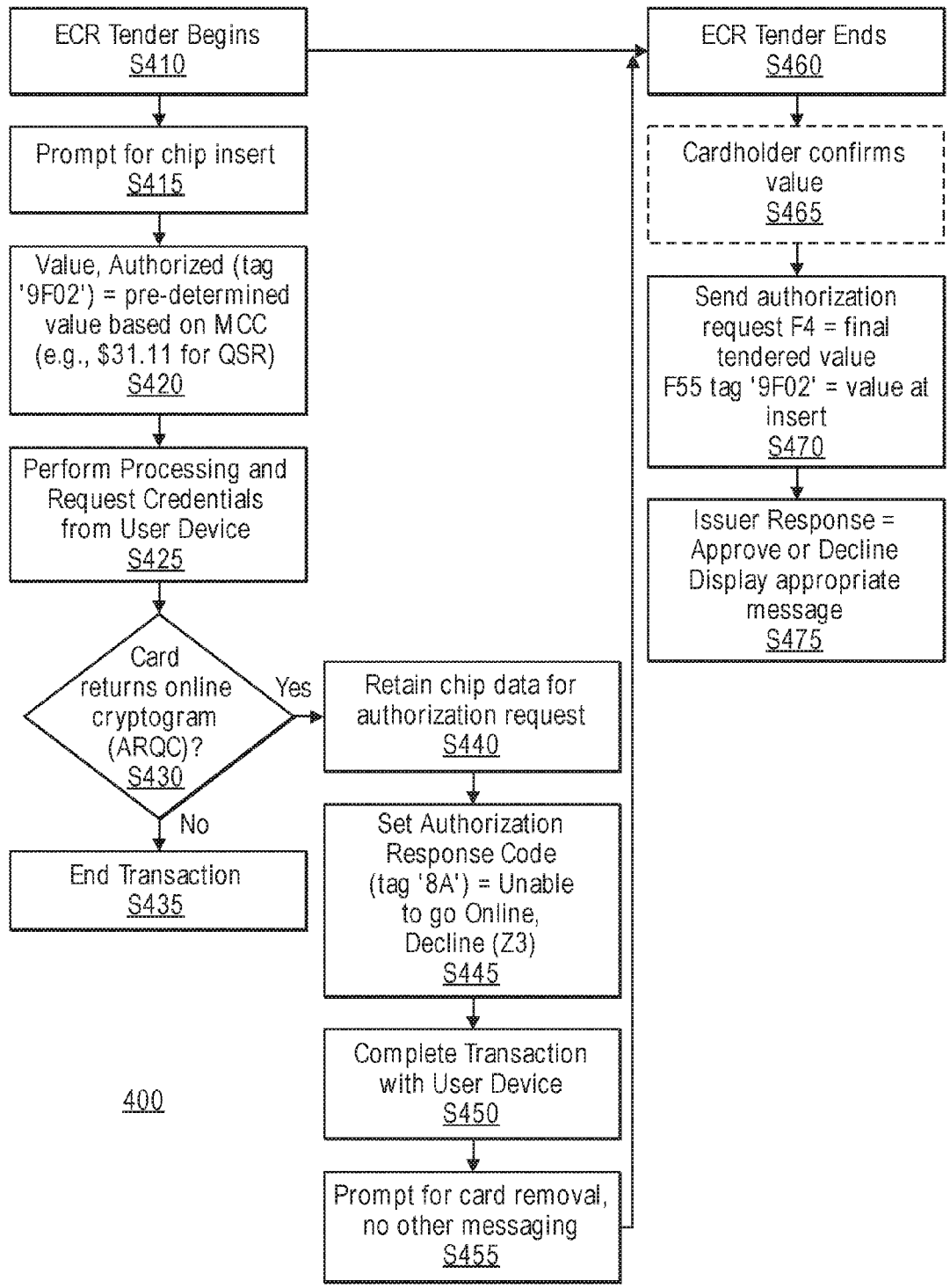
FIG. 4 shows a flow diagram illustrating a first method for processing a transaction, according to embodiments of the invention.

A method 400 according to embodiments of the invention can be described with respect to FIG. 4. Some elements in other Figures are also referred to.

Figure 5:
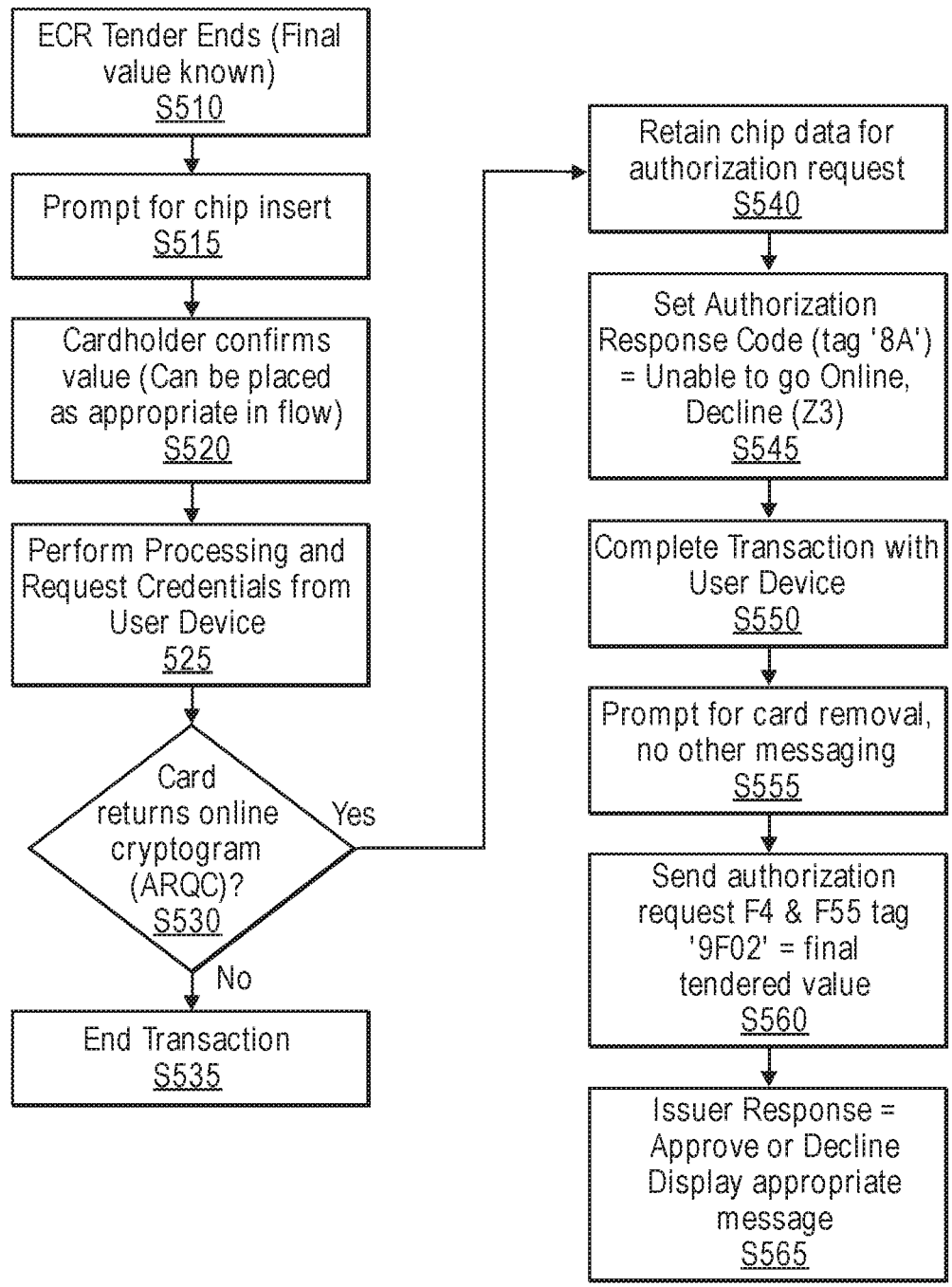
FIG. 5 shows a flow diagram illustrating a second method for processing a transaction, according to embodiments of the invention.
Figure 6:
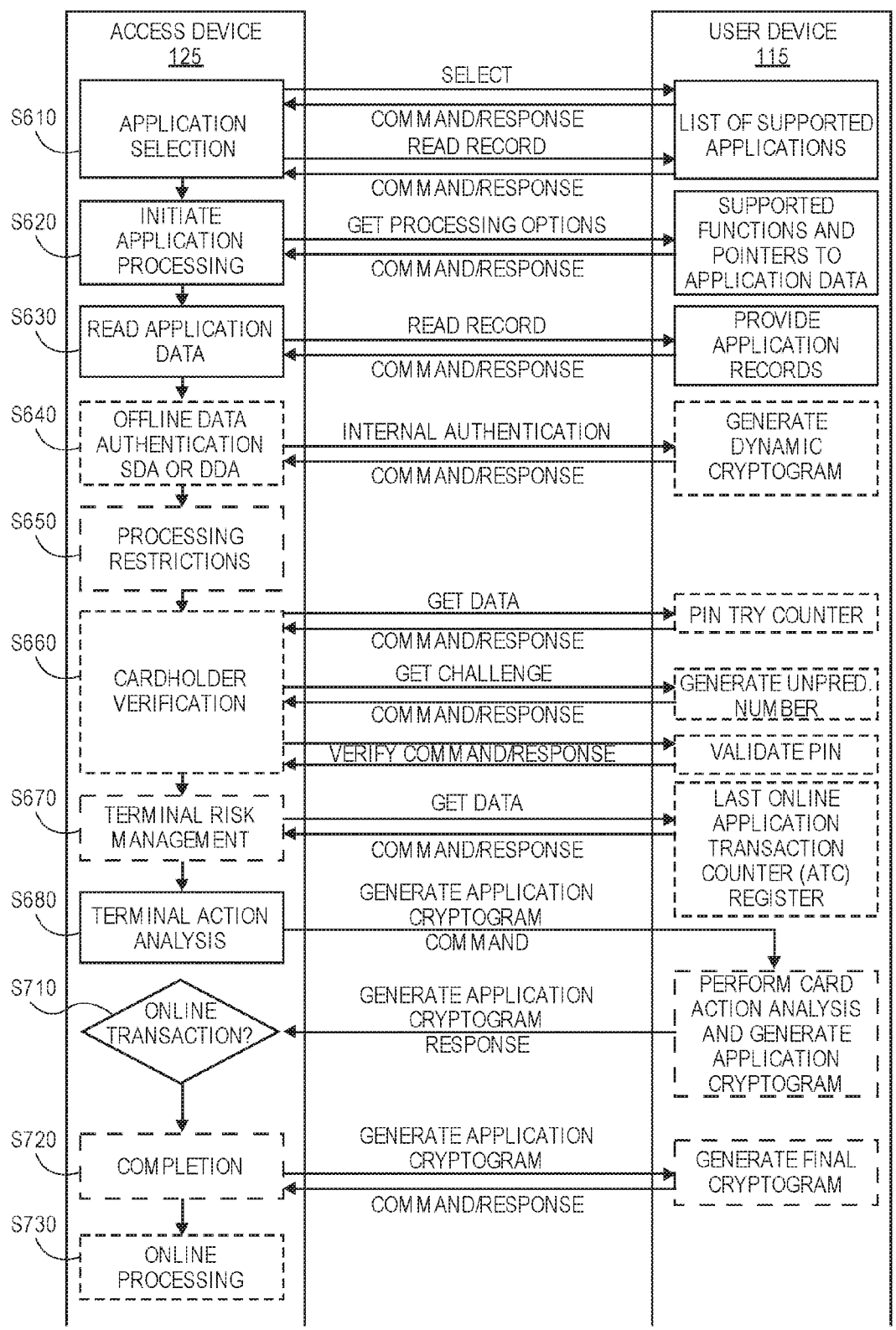
FIG. 6 shows a flow diagram illustrating transaction processing communications between a user device and access device.

The steps shown in the method 400, as well as the steps shown in FIGS. 5-7, may be performed sequentially or in any suitable order in embodiments of the invention. In some embodiments, one or more of the steps may be optional.

The various messages described below, as well as the messages described with respect to FIGS. 5-7, may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

The method 400 provides a faster communication exchange between the user device 115 and the access device 125 during a transaction. As mentioned above, this method can be utilized for any suitable type of transaction, such as a payment transaction, an access transaction, an authentication transaction, etc., and the transaction can involve any suitable type of value, such as an amount of funds, an identity credential, a cryptogram, a data value, etc. However, for the sake of explanation, a payment transaction for authorizing an amount of funds is described below.

At step S410, the transaction may begin. For example, the user 110 may approach an access device 125 at a resource provider location to purchase one or more goods and/or services. The access device 125 may begin receiving information about items for purchase and summing the amount for each item (e.g., during an "ECR or electronic cash register tender" process).

At step S415, the access device 125 may request the user 110 to provide a user device 115. The user 110 may then provide the user device 115 to the access device 125. For example, the user device 115 may be inserted into the access device 125, or otherwise physically connected to the access device 125. A contact interface (e.g., a chip plate) on the user device 115 may come in direct contact with a second contact interface at the access device 125. As a result, the access device 125 may be able to communicate with the user device 115 for transaction processing.

In some embodiments, the total transaction amount may not be fully calculated when the user device 115 is initially inserted. For example, the transaction may take place at a grocery store, and the user 110 may insert the user device 115 before all of the items have been entered into the access device 125 by a store clerk.

Further, in some embodiments, the user device 115 may generate and provide a cryptogram for the transaction, and the cryptogram may be based on the transaction amount. Accordingly, the user device 115 may wait until a transaction amount is received from the access device 125 before generating the cryptogram.

At step S420, the access device 125 may generate or identify a preset or estimated amount that can be used before the actual transaction amount is determined. The access device 125 may be able to provide this estimated amount to the user device 115, such that the user device 115 can generate the cryptogram with the estimated amount. As a result, transaction processing can continue immediately without waiting for all of the items to be scanned. This can enable communications between the access device 125 and user device 115 to be completed more quickly, and thereby allow the user 110 to remove the user device 115 from the access device 125 sooner.

The estimated amount may be determined based on the resource provider, a merchant category classification (MCC)), the type of transaction, the median transaction amount for the resource provider, or any other suitable considerations. For example, if transactions at the resource provider are typically in the range of $30-$35, the estimated amount may be set as $31.11 (e.g., an average amount). In some embodiments, utilizing an estimated amount that is within a normal range (e.g., an amount that is within $30-$35 for the above example) can serve to authenticate an authorization request at an issuer (e.g., because the issuer may know a normal transaction amount range for the resource provider).

In some embodiments, the estimated amount may be preset as a random number, or any other suitable number. Additionally, in some embodiments, the estimated amount may be the same for each transaction, or may change periodically (e.g., for each transaction, or once a day).

At step S425, the access device 125 may perform transaction processing communications with the user device 115. For example the access device 125 may provide the estimated amount to the user device 115, and may request credentials (e.g., payment credentials, a cryptogram, etc.) for the transaction from the user device 115. The user device 115 may provide credentials to the access device 125, and the credentials may include a cryptogram such as an authorization request cryptogram (ARQC), a transaction certificate (TC), or an application authentication cryptogram (AAC). A detailed example of the interactions between the access device 125 and the user device 115 at step S425 is described further below with respect to FIG. 6.

At step S430, the access device 125 may determine whether the user device 115 provided a cryptogram for online transaction processing (e.g., an ARQC). For example, the user device 115 may have provided a cryptogram, but the cryptogram may be an ARQC, a TC, or an AAC. If the user device 115 provided an ARQC, the access device 125 may be able to conduct an online authorization, and may proceed to step S440. The cryptogram may be based on at least the estimated transaction amount, an access device ID, and any other suitable information.

At step S435, if the access device 125 did not receive an ARQC from the user device 115, the access device 125 may end (e.g., cancel) the transaction. For example, the access device 125 may have received an AAC, which may indicate that the user device 115 rejected the transaction. In some embodiments, the access device 125 may not continue to step S440, but may continue with an alternative process. For example, the access device 125 may proceed to process an online transaction, but may not release the user device 115 until issuer authorization is received. Alternatively, the access device 125 may conduct an offline authorization.

At step S440, the access device 125 may store the information received from the user device 115 (e.g., if an ARQC was received at step S430). For example, the access device 125 may temporarily retain payment credentials, a transaction cryptogram, and any other suitable information received from the user device 115. The information may be stored so that the access device 125 can still use the information in an authorization request message after the user device 115 is removed. This can allow the user device 115 to be removed before an authorization request message is generated or sent.

At steps S445-S455, the access device 125 may allow the user device 115 to be removed. The access device 125 may have received the information necessary to process the transaction, so the user device 115 may no longer be needed.

In some embodiments, the access device 125 may allow the user device 115 to be removed by completing the transaction communications between the access device 125 and the user device 115. Completing the transaction communications with the user device 115 may cause the user device 115 to reset to a default setting, such that the user device 115 has a clean state and is ready for another later transaction.

In some embodiments, in order to complete the transaction with the user device 115, the access device 125 can request a second cryptogram from the user device 115. While requesting the second cryptogram, the access device 125 can inform the user device 115 that online authorization was not possible (e.g., due to a bad connection), that online authorization was successful, or that authorization was denied.

As an example, at step S445, the access device 125 may inform the user device 115 that an online connection is not available, meaning that authorization could not be completed online and the transaction should be declined or the authorization deferred. For example, an authorization response code may be set to indicate that an online connection is not available. Then, at step S450, the user device 115 may return a second cryptogram (e.g., an AAC), indicating that the transaction is declined or authorization can be deferred. Reception of the second cryptogram can indicate the completion of the transaction communications between the access device 125 and the user device 115. Accordingly, the user device 115 may be safely removed at this point.

At step S455, the user 110 may remove the user device 115 from the access device 125. For example, the access device 125 may prompt the user 110 to remove the user device 115. A visual display may be presented, an audible sound may be played, a store clerk can inform the user 110, or any other method can be used to inform the user 110 that the user device 115 can be removed.

Thus, the user device 115 may be removed after a short amount of time in the access device 125. The user 110 may not have to wait for the full transaction amount to be calculated, or for an authorization response message to be received. Instead, the user device 115 data can be stored, and the user device 115 can be released even before an authorization request message is sent. As a result, the user device 115 may be removed within two seconds of contacting the access device 125. This can reduce contact time by more than eighteen seconds (90%) when compared to the current possible insertion time of twenty or more seconds.

Further, even though removed earlier than normal, the user device 115 can still be removed in a clean state by requesting the second cryptogram earlier than normal (e.g., before an authorization response message is received). In reality, the access device 125 may actually have an online connection, and the access device 125 may have not yet received an authorization response message. However, the access device 125 can essentially provide false information to the user device 115 so that the user device 115 can complete its transaction process and be removed earlier than normal.

As mentioned above, the information received from the user device 115 at step S425 can be retained, and the transaction processing can continue even though the user device 115 is removed. Even though the access device 125 may receive an AAC, the access device may not decline the transaction, and instead may continue to process the transaction normally. For example, the access device 125 can continue to update the total transaction amount as new items are entered, and eventually the access device 125 can submit an authorization request message for the transaction.

At step S460, the access device 125 may have received information about all of the items being purchased. For example, a store clerk may finish with scanning each item.

As a result, the final transaction amount may be determined, and the ECR tender process may be completed.

At step S465, once the full transaction amount has been determined, the user 110 may confirm the actual amount for the transaction. For example, the access device 125 may display the total amount, and the user 110 may indicate acceptance (e.g., by pressing a key on a pin pad or providing a signature). The actual amount for the transaction may likely be different than the preset or estimated amount.

At step S470, the access device 125 (or the resource provider computer 130) may generate and send an authorization request message for the transaction. The authorization request message may include the actual transaction amount, the estimated or preset amount, the user device 115 credentials (e.g., payment credentials, an ARQC, etc.), and any other suitable information.

In some embodiments, the authorization request message may be generated earlier in the process, and the authorization request message may be modified to include the actual amount when it is known. In some embodiments, the actual amount may be included as data in a supplemental or actual data field in the authorization request message.

The authorization request message may be sent to the transport computer 140, which may forward it to the transaction processing computer 150, which may in turn forward it to the authorizing entity computer 160. The authorizing entity computer 160 may determine whether to authorize the transaction. For example, the authorizing entity computer 160 may validate a cryptogram (e.g., an ARQC), check for sufficient funds in the user's account, perform a risk analysis, and complete any other steps in order to determine whether to authorize the transaction. The authorizing entity computer 160 may then send an authorization response message indicating successful authorization back to the access device 125 (e.g., via the transaction processing computer 150, the transport computer 140, and/or the resource provider computer 130).

At step S475, the access device 125 may receive an authorization response message from the authorizing entity computer 160 indicating that the transaction is approved or declined. The access device 125 may display an appropriate message to the user 110 and/or store clerk, and the resource provider may release the purchased goods and/or services to the user 110.

At some point in time, a clearing and settlement process may occur between the transport computer 140, the transaction processing computer 150, and the authorizing entity computer 160.

Since the user device 115 is no longer be connected to the access device 125 when the authorization response message is received, the user device 115 may not receive information from the authorizing entity computer 160. For example, the user device 115 may not receive or authenticate an authorization response cryptogram (ARPC) from the authorizing entity, the user device 115 may not receive issuer scripts, and the user device 115 may not receive an updated counter (e.g., an offline transaction counter). However, all of this data may only be useful in offline transaction scenarios, and may not provide any useful function in areas where transactions are conducted online. As a result, the user device 115 is still useful even though it may be missing this information.

As described above, by using an estimated amount and beginning the transaction with this amount (e.g., for an "amount authorized" field when communicating with the user device 115), the amount of time that the user device needs to be inserted into the access device is minimized. This is because the communications between the user device and access device can be completed without waiting for the actual transaction amount to be calculated.

Additionally, the access device 125 can inform the user device 115 that authorization is declined (e.g., due to no online connection) such that the user device 115 can revert to a clean state and then be removed. The user device 115 data can be stored for final processing when the final amount of the transaction is determined. Thus, the insertion time can be further reduced as the user device 115 can be removed before an authorization request message is sent and before an authorization response message is received.

Additionally, in some embodiments, signature capture can be deferred (e.g., so that the user device 115 can be removed before a signature is captured). In some embodiments, if the final amount is less than a payment limit, no signature capture may be required. On the other hand, if the final amount is greater than the payment limit, then a user signature may be captured after transaction approval.

In some embodiments, implementation of this method does not require changes to standard transaction processing routines, associated hardware, or the user device. This method for enabling a shorter user device insertion time may be accomplished with minor software updates to the access device 125 communication procedures. Additionally, the changes made to accomplish this method do not cause any reduction in security. The cryptogram strength and overall transaction security may be maintained, and online authorization can still take place in the same secure manner.

In some embodiments, the total transaction amount may be determined and known before the user 110 provides the user device 115 to the access device 125. For example, at a restaurant, payment may be provided after goods and services are received, and the user 110 may provide payment after the transaction amount has been calculated. Accordingly, in some embodiments, the transaction can be processed without the estimated amount. A method 500 for conducting such a transaction, according to embodiments of the invention, can be described with respect to FIG. 5.

At step S510, the transaction may begin. For example, the user 110 may approach an access device 125 at a resource provider location to purchase one or more goods and/or services. In some embodiments, the final transaction amount may be known or determined at this point. For example, the user's items may already be scanned at the access device 125, the user 110 may only purchase one item that is quickly scanned at the access device 125, or the user 110 may provide payment for goods or services already acquired (e.g., food at a restaurant). In some embodiments, an ECR tender process may end when the final transaction amount is known (e.g., because all of the items may have been scanned and the amount finalized at the access device 125).

At step S515, the access device 125 may request the user 110 to provide a user device 115. For example, the access device 125 may prompt the user 110 for a user device 115 once the ECR tender process ends. The user 110 may then provide the user device 115 to the access device 125. For example, the user device 115 may be inserted into the access device 125, or otherwise physically connected to the access device 125. A contact interface (e.g., a chip plate) on the user device 115 may come in direct contact with a second contact interface at the access device 125. As a result, the access device 125 may be able to communicate with the user device 115 for transaction processing.

At step S520, the user 110 may confirm the amount for the transaction. For example, the access device 125 may display the total amount, and the user 110 may indicate acceptance (e.g., by pressing a key on a pin pad or providing a signature). In some embodiments, the user 110 can confirm the amount before the user device 115 is provided, while the user device 115 is inserted, after the user device 115 is removed, or at any other suitable point in the flow.

At step S525, the access device 125 may perform transaction processing communications with the user device 115. For example the access device 125 may provide the transaction amount to the user device 115, and may request credentials (e.g., payment credentials, a cryptogram, etc.) for the transaction from the user device 115. The user device 115 may provide credentials to the access device 125, and the credentials may include a cryptogram (e.g., an ARQC, TC, or AAC). A detailed example of the interactions between the access device 125 and the user device 115 at step S525 is described further below with respect to FIG. 6.

At step S530, access device 125 may determine whether the user device 115 provided a cryptogram for online transaction processing (e.g., an ARQC). For example, the user device 115 may have provided a cryptogram, but the cryptogram may be an ARQC, a TC, or an AAC. If the user device 115 provided an ARQC, the access device 125 may be able to conduct an online authorization, and may proceed to step S540. The cryptogram may be based on at least the final transaction amount, an access device ID, and any other suitable information.

At step S535, if the access device 125 did not receive an ARQC from the user device 115, the access device 125 may end (e.g., cancel) the transaction. For example, the access device 125 may have received an AAC, which may indicate that the user device 115 rejected the transaction. In some embodiments, the access device 125 may not continue to step S440, but may continue with an alternative process. For example, the access device 125 may proceed to process an online transaction, but may not release the user device 115 until issuer authorization is received. Alternatively, the access device 125 may conduct an offline authorization.

At step S540, the access device 125 may store the information received from the user device 115 (e.g., if an ARQC was received at step S430). For example, the access device 125 may temporarily retain payment credentials, a cryptogram, and any other suitable information received from the user device 115. The information may be stored so that the access device 125 can still use the information in an authorization request message after the user device 115 is removed. This can allow the user device 115 to be removed before an authorization request message is generated or sent.

At steps S545-S555, the access device 125 may allow the user device 115 to be removed. The access device 125 may have received the information necessary to process the transaction, so the user device 115 may no longer be needed.

In some embodiments, the access device 125 may allow the user device 115 to be removed by completing the transaction communications between the access device 125 and the user device 115. Completing the transaction communications with the user device 115 may cause the user device 115 to reset to a default setting and/or dormant state, such that the user device 115 has a clean state and is ready for another later transaction.

In some embodiments, in order to complete the transaction with the user device 115, the access device 125 can request a second cryptogram from the user device 115. While requesting the second cryptogram, the access device 125 can inform the user device 115 that online authorization was not possible (e.g., due to a bad connection), that online authorization was successful, or that authorization was denied.

As an example, at step S545, the access device 125 may inform the user device 115 that an online connection is not available, meaning that authorization could not be completed online and the transaction should be declined or the authorization deferred. For example, an authorization response code may be set to indicate that an online connection is not available. Then, at step S550, the user device 115 may return a second cryptogram (e.g., an AAC), indicating that the transaction is declined or authorization can be deferred. Reception of the second cryptogram can indicate the completion of the transaction communications between the access device 125 and the user device 115. Accordingly, the user device 115 may be safely removed at this point.

At step S555, the user 110 may remove the user device 115 from the access device 125. For example, the access device 125 may prompt the user 110 to remove the user device 115. A visual display may be presented, an audible sound may be played, a store clerk can inform the user 110, or any other method can be used to inform the user 110 that the user device 115 can be removed.

Thus, the user device 115 may be removed after a short amount of time in the access device 125. The user 110 may not have to wait for an authorization response message to be received. Instead, the user device 115 data can be stored, and the user device 115 can be released even before an authorization request message is sent. As a result, the user device 115 may be removed within two seconds of contacting the access device 125. This can reduce contact time by more than eighteen seconds (90%) when compared to the current possible insertion time of twenty or more seconds.

Further, even though removed earlier than normal, the user device 115 can still be removed in a clean state and/or dormant state by requesting the second cryptogram earlier than normal (e.g., before an authorization response message is received). In reality, the access device 125 may actually have an online connection, and the access device 125 may have not yet received an authorization response message. However, the access device 125 can essentially provide false information to the user device 115 so that the user device 115 can complete its transaction process and be removed earlier than normal.

As mentioned above, the information received from the user device 115 at step S525 can be retained, and the transaction processing can continue even though the user device 115 is removed. Even though the access device 125 may receive an AAC, the access device may not decline the transaction, and instead may continue to process the transaction normally. For example, the access device 125 can submit an authorization request message for the transaction.

At step S560, the access device 125 (or the resource provider computer 130) may generate and send an authorization request message for the transaction. The authorization request message may include the transaction amount, the user device 115 credentials (e.g., payment credentials, an ARQC, etc.), and any other suitable information.

In some embodiments, the user device 115 may still be connected to the access device 125 when the authorization request message is sent. For example, the authorization request message may be generated and sent quickly, such that the message is sent before the user 110 has removed the user device 115.

The authorization request message may be sent to the transport computer 140, which may forward it to the transaction processing computer 150, which may in turn forward it to the authorizing entity computer 160. The authorizing entity computer 160 may determine whether to authorize the transaction. For example, the authorizing entity computer 160 may validate a cryptogram (e.g., an ARQC), check for sufficient funds in the user's account, perform risk analysis, and complete any other steps in order to determine whether to authorize the transaction. The authorizing entity computer 160 may then send an authorization response message indicating successful authorization back to the access device 125 (e.g., via the transaction processing computer 150, the transport computer 140, and/or the resource provider computer 130).

At step S565, the access device 125 may receive an authorization response message from the authorizing entity computer 160 indicating that the transaction is approved or declined. The access device 125 may display an appropriate message to the user 110 and/or store clerk, and the resource provider may release the purchased goods and/or services to the user 110.

At some point in time, a clearing and settlement process may occur between the transport computer 140, the transaction processing computer 150, and the authorizing entity computer 160.

Since the user device 115 may no longer be connected to the access device 125 when the authorization response message is received, the user device 115 may not receive information from the authorizing entity computer 160. For example, the user device 115 may not receive or authenticate an authorization response cryptogram (ARPC) from the authorizing entity, the user device 115 may not receive issuer scripts, and the user device 115 may not receive an updated counter (e.g., an offline transaction counter). However, all of this data may only be useful in offline transaction scenarios, and may not provide any useful function in areas where transactions are conducted online. As a result, there may be no loss of function to the user device 115 in missing this information.

As described above, in some embodiments, the transaction amount may be known before or shortly after inserting the user device 115 into the access device 125. Accordingly, the user device 115 can immediately receive the transaction amount and then generate a cryptogram based on the transaction amount. As a result, user device 115 and access device 125 communications can be completed soon after the user device 115 is inserted.

In some embodiments, the user device 115 can be removed shortly after it is inserted into an access device 125. The access device 125 can inform the user device 115 that authorization is declined (e.g., due to no online connection) such that the user device 115 can revert to a clean and/or dormant state and then be removed. The user device 115 data can be stored for authorization processing after the user device 115 is removed. Thus, the insertion time can be reduced as the user device 115 can be removed without waiting for an authorization response and any subsequent processing.

Additionally, signature capture can be deferred (e.g., so that the user device 115 can be removed before a signature is captured). In some embodiments, if the final amount is less than a payment limit, no signature capture may be required. On the other hand, if the final amount is greater than the payment limit, then a user signature may be captured after transaction approval.

In some embodiments, implementation of this method may require no changes to standard transaction processing routines, associated hardware, or the user device. This method for enabling a shorter user device insertion time may be accomplished with minor software updates to the access device 125 communication procedures. Additionally, the changes made to accomplish this method may not cause any reduction in security. The cryptogram strength and overall transaction security may be maintained, and online authorization can still take place in the same secure manner.

Embodiments of the invention can involve a number of communications between the user device 115 and the access device 125. For example, several messages can be exchanged during step S425 in the method 400 and step S525 in the method 500 in order to process the transaction and obtain information from the user device 115. An example flow 600 of these communications is shown in FIG. 6.

When a user device 115 contacts an access device 125, the user device 115 and access device 125 are then able to communicate. Several processing steps may take place in order to identify and prepare data for transmission to the access device 125 for the transaction. In some embodiments, Application Protocol Data Unit (APDU) messages can be exchanged between the user device 115 and the access device 125. The messages can be in the form of APDU commands sent from the access device 125 to the user device 115, and APDU responses sent from the user device 115 to the access device 125. However, it should be understood that other messages, messaging protocols, or formats can be used to exchange the relevant information to conduct the transaction.

At step S610, the access device 125 may perform application selection. For example, the access device 125 may determine which applications are supported by both the user device 115 and the access device 125. In some embodiments, when the access device 125 detects the presence of the user device 115, the access device 125 may send an available applications request to the user device 115 to request information on which payment applications (e.g., a list of AIDs) may be available at the user device 115. In some embodiments, the available applications request may be in the form of a select command.

The user device 115 may respond by sending an available applications response back to access device 125. The available applications response may include a list of available AIDs. In some embodiments, the available applications response may be in the form of a select response.

The access device 125 may then select a suitable application from the list of applications received in the available applications response (e.g., by selecting an AID from the available AIDs). For example, the access device 125 may select a payment application (e.g., the highest priority application) that is supported by both the access device 125 and the user device 115. In some embodiments, the access device 125 may display the mutually supported applications and allow the user 110 to select an application to be used for the transaction.

The access device 125 may also send an application selection message with the selected AID to the user device 115. In some embodiments, the application selection can be in the form of a read record command or a select AID (or ADF) command.

The user device 115 may then send a request for transaction data to the access device 125 which may be needed to execute the transaction using the selected application/AID. In some embodiments, the request may be in the form of a read record response or a select AID (or ADF) response. The request may include a list of transaction data identifiers, and the list can be in the form of a processing options data object list (PDOL). The transaction data requested may include terminal transaction qualifiers (TTQ), authorized amount, other amount, terminal country code, terminal verification results, transaction currency code, transaction data, transaction type, and/or an unpredictable number.

At step S620, the access device 125 may initiate application processing. For example, the access device 125 may request that the user device 115 indicate the data (e.g., a list of files containing the data) to be used for the selected application and the functions supported. In some embodiments, the access device 125 may send a get processing options (GPO) command. The access device 125 may also provide transaction information to the user device 115 (e.g., via the GPO command). For example, the access device 125 may provide the transaction data requested by the user device 115 via a processing options data object list (PDOL). The transaction data provided may include a transaction amount, such as a final transaction amount or an estimated transaction amount (e.g., if the final transaction amount is not yet known).

The user device 115 may then generate dynamic transaction processing information using at least some of the received terminal transaction data, and send a set of transaction processing information to the access device 125. In some embodiments, the transaction processing information can be sent in the form of a GPO response. In some embodiments, the transaction processing information may include one or more application file locators (AFLs) that can be used as file addresses by access device 125 to read account data stored on user device 115.

At step S630, the access device 125 may read application data. For example, the access device 125 may send an account data request to the user device 115 to read account data stored at the user device 115. In some embodiments, the account data request may be in the form of a read record command, and may include an application file locator (AFL) indicating the location of the account data.

The user device 115 may then send the account data to the access device 125. In some embodiments, the account data may be sent in the form of a read record response. The account data may include, for example, track-2 equivalent data (e.g., payment credentials) and the cardholder name, and/or other account related data that is accessible at the AFL location.

One or more steps of authentication and verification can be performed to validate that the transaction can proceed. For example steps S640-S680 provide various authentication processes. In some embodiments, one or more of these steps may be skipped, as online authentication and/or authorization may be a sufficient alternative.

At step S640, the access device 125 may determine whether it should authenticate the user device 115 offline. The determination can be made based on whether the user device 115 supports offline authentication. In some embodiments, one or more types of offline authentication can take place, such as Static Data Authentication (SDA) or Dynamic Data Authentication (DDA).

At step S650, the access device 125 may check for processing restrictions. For example, the access device 125 may determine whether the transaction should be allowed to continue based on a user device expiration date, a user device effective date, matching of applications between the user device 115 and access device 125, usage restrictions (e.g., restriction of international purchases or cashback services), and any other suitable restrictions.

At step S660, the access device 125 may perform cardholder verification. For example, the user 110 may be verified as the rightful user of the user device 115 and not a fraudster. One or more card verification methods (CVMs) can be used. For example, the user 110 may be prompted to provide a PIN (e.g., verified online with the authorizing entity or offline with the user device 115), signature, or any other suitable method of authentication.

At step S670, the access device 125 may perform terminal risk management. For example, the access device 125 may perform velocity checking, determine whether the transaction exceeds a merchant floor limit, check if the account number is flagged for denial, determine whether a limit of consecutive transactions has been exceeded, and/or check for any other suitable fraud indicators.

At step S680, the access device 125 may perform a terminal action analysis. For example, the access device may determine whether the transaction should be approved offline, sent online for authorization, or declined offline. This determination can be based on one or more of the above authentication and risk analysis steps (e.g., steps S640-S670). As mentioned above, in some embodiments, all transactions may be authorized online. Accordingly, the access device 125 may automatically proceed to an online authorization process.

The access device 125 may then request a cryptogram from the user device 115 (e.g., via a generate application cryptogram command). The access device 125 may specifically request an authorization request cryptogram (ARQC), a transaction certificate (TC), or an application authentication cryptogram (AAC). In some embodiments, an ARQC may be requested for online authorization, a TC may be requested for offline authorization (e.g., already approved offline), and an AAC may be requested for a transaction decline or an authorization deferral.

The user device 115 may then determine what type of cryptogram to provide to the access device. For example, the user device 115 may provide an ARQC to proceed with online authorization. Alternatively, the user device 115 may determine that the transaction should be declined, and may return an AAC.

In some embodiments, an ARQC can be generated based on transaction-specific information. For example, a transaction amount received from the access device 125 (e.g., in step S620), a transaction ID, a merchant identifier, and any other suitable transaction-linked information can be used as inputs to an ARQC-generating algorithm. Any other suitable information can also be used as input, such as a random number, a transaction counter, etc. The ARQC may be generated using an authorizing entity key that is stored in the user device 115 and known at the authorizing entity computer 160. Accordingly, the authorizing entity computer 160 can authenticate the ARQC when it is received with an authorization request message.

In some embodiments, once the user device 115 sends the cryptogram to the access device 125, the communications between the user device 115 and access device 125 may have achieved their primary purposes (e.g., providing credentials to the access device 125 for the transaction). Accordingly, steps S610-S680 may encompass the processing mentioned at step S425 in the method 400 and at step S525 in the method 500.

The method 600 continues with additional steps for cleanly completing the communication exchange between the access device 125 and the user device 115, removing the user device 115, and authorizing the transaction. These steps overlap with steps already described with respect to FIGS. 4-5. (e.g., steps S430-S475 in the method 400 and steps S630-S565 in the method 500).

At step S710, the access device 125 may receive the cryptogram from the user device 115 and determine whether to authorize the transaction online. For example, analogous to steps S430 and S530, the access device 125 may determine whether the cryptogram is an ARQC. In some embodiments, if an ARQC is received, the access device 125 may continue with an online authorization process.

The access device 125 may store the user device 115 information (e.g., account credentials, cryptogram, etc.) for later processing (e.g., as mentioned at steps S440 and S540). For example, the final transaction amount may not yet be known, so the access device 125 may retain the user device 115 information until authorization can be completed.

Once the necessary user device 115 information (e.g., account credentials, cryptogram, etc.) is received and stored, the user device 115 may no longer be needed at the access device 125. Accordingly, the communications between the access device 125 and user device 115 can be completed and the user device 115 removed at an earlier time (e.g., as mentioned at steps S445-S455 and S545-S555). For example, the user device 115 can be removed before the final transaction amount is calculated, before an authorization response message is sent, and before an authorization response message is received.

At step S720, the access device 125 may complete the transaction communications with the user device 115 online (e.g., as mentioned with respect to steps S455 and S550). For example, the access device 125 may request a second cryptogram from the user device 115, as the user device 115 may revert to a default setting after providing a second cryptogram.

The access device 125 may use a second generate application cryptogram command to request the second cryptogram. In some embodiments, the access device 125 may request an AAC, indicating that the transaction should be declined or deferred because authorization could not go online (e.g., as mentioned with respect to steps S445 and S545). While, in reality, authorization can go online (and may have not even been attempted yet), this command may be used just to complete communications with the user device 115. The false information about declining or deferring the transaction may have no bearing on the actual transaction, or any negative affect on the user device 115.

In some embodiments, the access device 125 may alternatively indicate that the transaction was successfully authorized (even though authorization has not yet taken place) and request a TC.

The user device 115 may then respond with a generate application cryptogram response that includes an AAC. The user device 115 may then complete its internal processing, revert to a clean, default, and/or dormant setting, and thereby be ready for removal from the access device 125.

Once the access device 125 receives the second cryptogram from the user device 115, the access device 125 may prompt the user 110 to remove the user device 115 from the access device 125 (e.g., as mentioned with respect to steps S455 and S555).

Thus, the user device 115 may be removed after one continuous stream of communications with the access device 125. There may be no delays in the communications due to calculating a transaction amount or obtaining online authorization. Instead, information can be obtained from the user device 115 in a short amount of time, the user device can be removed 125, and the access device 125 can continue processing the transaction without the user device 115 connected.

At step S730, once the final transaction amount is known, the access device 125 may process the transaction online. For example, the access device 125 may generate an authorization request message and send the authorization request message to the authorizing entity computer 160 for authorization (e.g., as described in steps S470-S475 and steps S560-S565).

Embodiments of the invention have a number of advantages. For example, in embodiments of the invention, transaction processing communications between a user device (e.g., a smart card or integrated chip card) and an access device may happen quickly and efficiently. All of the communications between the user device and the access device can happen in one immediate and streamlined flow without any delays. For example, upon contact with the user device, the access device can immediately provide a transaction value (e.g., a final value or an estimated value). As a result, the user device can immediately generate a cryptogram based on the value (and other information). Additionally, once the access device receives the credentials (e.g., account information and cryptogram) from the user device, the access device can complete the transaction communications and the user device can be removed. The user may be able to remove the user device without waiting for an authorization response message or post-authorization processing.

Embodiments of the invention can advantageously reduce the contact time between the user device and access device to two seconds or less. Thus, embodiments allow an average reduction in six to ten seconds (75%-83%) when compared to the current average of eight to twelve second insertion time, as well as a potential time reduction of eighteen seconds or more (90% or more) when compared to the current possible insertion time of twenty or more seconds. In addition to a reduction in the actual contact time, a user may perceive an even greater reduction in contact time.

Embodiments of the invention can further advantageously reduce the total transaction time. For example, embodiments allow post-authorization processing, such as issuer-to-card script processing and issuer authentication at the user device to be eliminated. Removing these steps not only reduces the amount of time the user device is inserted at the access device, but also reduces the amount of time the user is waiting at the access device (e.g., before goods and services are released and the user can leave). In embodiments, the user device may not receive issuer response information (e.g., data received in an authorization response message). However, this data may be unnecessary for online transactions. Accordingly, shortening the contact time, as described herein, may not have any downsides (e.g., no reduction in security and no loss of useful information).

Embodiments of the invention advantageously allow the user device to have a clean state at the end of the transaction, even though the user device is removed earlier than normal. For example, the access device can request a second cryptogram at an earlier than normal time (e.g., by falsely indicating a failed online connection), such that the user device can complete its transaction processing and then be removed.

Embodiments of the invention can advantageously be achieved without changes to hardware, changes to EMV transaction processing standards, or changes to the user device. Instead, a software update at the access device can enable to new steps and communications described herein.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
   physically contacting, by an access device, a user device;
   receiving, by the access device, credentials from the user device for a transaction;
   storing, by the access device, the credentials;
   sending, by the access device, a message to the user device informing the user device that the transaction is completed or that transaction authorization will be deferred because online authorization is not available, even though online authorization is available;
   receiving, by the access device, a cryptogram from the user device, wherein the user device returns to a default setting after sending the cryptogram, thereby completing, by the access device, communications with the user device;
   allowing, by the access device after completing communications with the user device, the user device to be removed from the access device before an authorization response message for the transaction is received from an authorizing entity computer;
   generating, by the access device, an authorization request message for the transaction, wherein the authorization request message includes the cryptogram;
   transmitting, by the access device, the authorization request message to the authorizing entity computer; and
   receiving, by the access device, the authorization response message for the transaction from the authorizing entity computer while the user device is physically separated from the access device.

2. The method of claim 1, wherein the user device is a card.

3. The method of claim 1, further comprising:
   providing, by the access device, an estimated value to the user device, wherein the cryptogram is based on the estimated value; and
   prompting, by the access device, a user to confirm a final value, wherein the authorization request message further includes the estimated value and the final value.

4. The method of claim 1, further comprising:
   prompting, by the access device, a user to confirm a final value; and
   providing, by the access device, a final value to the user device, wherein the cryptogram is based on the final value, and wherein the authorization request message further includes the final value.

5. The method of claim 1, wherein
   the message to the user device is a message informing the user device that the transaction is completed.

6. The method of claim 1, wherein
   the message to the user device is a message informing the user device that transaction authorization will be deferred because online authorization is not available, even though online authorization is available.

7. The method of claim 1, further comprising:
   displaying, by the access device, an indication that the transaction is authorized.

8. The method of claim 1, wherein the authorization request message is generated and transmitted to the authorizing entity computer while the user device is physically separated from the access device.

9. An access device comprising:
   a processor; and
   a non-transitory computer readable medium coupled to the processor, the non-transitory computer readable medium comprising code, executable by the processor, for implementing a method comprising:
   receiving credentials from a user device in physical contact with the access device for a transaction;
   storing the credentials;
   sending a message to the user device informing the user device that the transaction is completed or that transaction authorization will be deferred because online authorization is not available, even though online authorization is available;
   receiving a cryptogram from the user device, wherein the user device returns to a default setting after sending the cryptogram, thereby completing communications with the user device;
   allowing, after completing communications with the user device, the user device to be removed from the access device before an authorization response message for the transaction is received from an authorizing entity computer;

generating an authorization request message for the transaction, wherein the authorization request message includes the cryptogram;

transmitting the authorization request message to the authorizing entity computer; and receiving the authorization response message for the transaction from the authorizing entity computer while the user device is physically separated from the access device.

10. The access device of claim 9, wherein the user device is a card.

11. The access device of claim 9, further comprising:
providing an estimated value to the user device, wherein the cryptogram is based on the estimated value; and
prompting a user to confirm a final value, wherein the authorization request message further includes the estimated value and the final value.

12. The access device of claim 9, further comprising:
prompting user to confirm a final value; and
providing a final value to the user device, wherein the cryptogram is based on the final value, and wherein the authorization request message further includes the final value.

13. The access device of claim 9, wherein
the message to the user device is a message informing the user device that the transaction is completed.

14. The access device of claim 9, wherein
the message to the user device is a message informing the user device that transaction authorization will be deferred because online authorization is not available, even though online authorization is available.

15. The access device of claim 9, further comprising:
displaying an indication that the transaction is authorized.

16. The access device of claim 9, wherein the authorization request message is generated and transmitted to the authorizing entity computer while the user device is physically separated from the access device.

17. A non-transitory computer-readable storage device with computer-executable instructions stored thereon that, when executed by an access device, cause the access device to perform operations comprising:

receiving credentials from a user device in physical contact with the access device for a transaction;

storing the credentials;

sending a message to the user device informing the user device that the transaction is completed or that transaction authorization will be deferred because online authorization is not available, even though online authorization is available;

receiving a cryptogram from the user device, wherein the user device returns to a default setting after sending the cryptogram, thereby completing communications with the user device;

allowing, after completing communications with the user device, the user device to be removed from the access device before an authorization response message for the transaction is received from an authorizing entity computer;

generating an authorization request message for the transaction, wherein the authorization request message includes the cryptogram;

transmitting the authorization request message to the authorizing entity computer; and receiving the authorization response message for the transaction from the authorizing entity computer while the user device is physically separated from the access device.

18. The non-transitory computer-readable storage device of claim 17, wherein the user device is a card.

19. The non-transitory computer-readable storage device of claim 17, displaying, by the access device, an indication that the transaction is authorized.

20. The non-transitory computer-readable storage device of claim 17, wherein the authorization request message is generated and transmitted to the authorizing entity computer while the user device is physically separated from the access device.

* * * * *